Nov. 9, 1965  TETSU WATANUKI ETAL  3,216,411
INGESTIBLE TRANSMITTER FOR THE DETECTION OF BLEEDING
IN THE GASTROINTESTINAL CANAL
Filed May 13, 1963
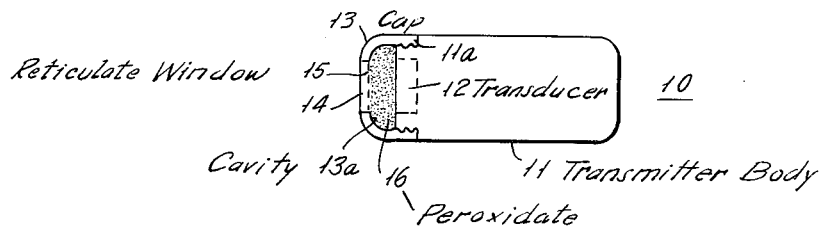
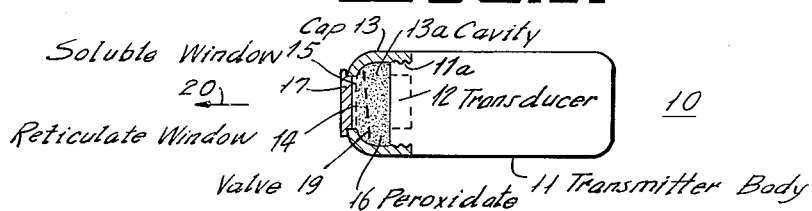
INVENTORS
TETSU WATANUKI
KOZO SUMA
BY HIROSHI WATANABE
OSTROLENK, FABER, GERB & SOFFEN
ATTORNEYS United States Patent Office 3,216,411
Patented Nov. 9, 1965

3,216,411
INGESTIBLE TRANSMITTER FOR THE DETECTION OF BLEEDING IN THE GASTROINTESTINAL CANAL
Tetsu Watanuki, Tokyo, Kozo Suma, Oyaba, Urawa-shi, Saitama, and Hiroshi Watanabe, Tokyo, Japan, assignors to Nippon Electric Company Limited, Minatoku, Tokyo, Japan, a corporation of Japan
Filed May 13, 1963, Ser. No. 279,811
Claims priority, application Japan May 16, 1962
7 Claims. (Cl. 128—2)

This invention relates to transmitters and more particularly to an information transmitter which is suitable to be swallowed by human beings or animals [hereinafter referred to as test objects] to detect a bleeding region in a digestive organ of the test object.

If bleeding has been found to exist somewhere in any digestive organs of the test object, it has hithertofore been necessary to cut the digestive organ open to locate the exact source of bleeding. This has been a very difficult procedure and further places the test object's welfare in jeopardy. This invention contemplates the elimination of such disadvantages of the prior art.

According to the present invention, there is provided an information transmitter which, when swallowed by the test object and brought into contact with the blood in a digestive organ, shows an abrupt change in its transmitting signal which is received exterior of the body of the test object, thereby enabling simple detection of the bleeding region.

In general, the principle of the invention is based upon the fact that an enzyme called catalase is present in blood. Catalase has the property that it acts as a catalyzer for the decomposition of hydrogen peroxide. Accordingly, when hydrogen peroxide is mixed with blood, the hydrogen peroxide will be decomposed into water and oxygen with simultaneous production of some heat of reaction. The oxygen or heat of reaction resulting from the above chemical reaction may be used to detect the blood present in the organ due to the bleeding condition.

The instant invention is comprised of a substantially small information transmitter means containing means for transmitting electromagnetic waves in one portion thereof, which waves may be received at a location exterior of the test object wherein the modulation of said waves provide an indication of the bleeding condition location. The second portion of the information transmitter body, or housing, provides a cavity of receiving a solid state peroxidate which may communicate with the exterior of the information transmitter housing through a reticulate window having dimensions so as to substantially prevent the solid state peroxidate from spilling out of the cavity. The information transmitter is swallowed by the test object and passes into the digestive organ thereof. Once the information transmitter reaches the bleeding region, the blood comes in contact with the solid state peroxidate, causing decomposition thereof. The decomposition reaction produces a heat of reaction through the catalytic function of the catalase contained in the blood. The heat of reaction given off effects a temperature sensitive impedance means provided in the information transmission means causing a modulation of the output signal generated by the electromagnetic wave generating means. This signal is then received at a point exterior of the test object to detect the position of the bleeding condition. While the body temperature of the test object may not always be constant, the information transmitter is presented with a temperature change which is easily distinguishable from the test object temperature fluctuations since it is much more abrupt. The cavity receiving the solid state peroxidate has a removable cap enabling the information transmitter to be reused simply by removing the cap, placing a new solid state peroxidate therein and placing the cap so as to again make the information transmitter available for subsequent use thereof.

It is therefore one object of the instant invention to provide a novel information transmitter designed to be swallowed by a test object to locate the position of a bleeding condition within the test object.

Still another object of the instant invention is to provide novel information transmitter means for locating the position of a bleeding condition within a test object wherein the information transmitter means is provided with a solid state peroxidate which reacts with the blood emanating from the bleeding source to produce an abrupt heat of reaction.

Still another object of the instant invention is to provide novel information transmitter means for use in locating the position of a bleeding condition within a test object which employs a solid state peroxidate which comes in physical contact with the bleeding condition to suitably modulate electromagnetic wave generating means within the information transmitter which waves may be detected exterior of the test object to pin point the location of the bleeding condition.

These and other objects of the instant invention will become apparent when reading the accompanying description and drawings in which:

FIGURE 1 is a sectional view of an embodiment designed in accordance with the invention.

FIGURE 2 is a sectional view of another preferred embodiment of the instant invention.

As previously described, the catalase, which is present in the blood, acts as a catalyzer for the decomposition of hydrogen peroxide. Since hydrogen peroxide, however, is in liquid form, it is unsuitable for use in the device of the instant invention. The device of the instant invention, as shown in FIGURE 1, is comprised of an information transmitter 10 having a transmitter body 11 thereof which is a suitable electromagnetic wave generating means (not shown in detail) having a variable impedance means 12 contained therein to modulate the waves generted by the wave generating means in transmitter body 11 for identifying the heat of reaction condition caused by the chemical decomposition referred to above. While a vairety of such electromagnetic wave generating means are available, one typical example of such wave generating means which may be employed in the information transmitter of the instant invention is fully set forth in copending U.S. application Serial Number 228,694, entitled Data Transmitter, filed October 5, 1962, by H. Watanabe, and assigned to the assignee of the instant invention. Basically, the data transmitter is comprised of suitable oscillating means, the operating frequency of which is varied in accordance with a suitable transducer device which acts as a variable impedance, the impedance magnitude of which varies in accordance with the temperature of the transducer means. Such an electromagnetic wave generating means is housed in the transmitter body 11 of the information transmitter 10. The temperature sensitive transducer 12 is mounted in the transmitter body in a position as shown in FIGURE 1. The left-hand end of the information transmitter means 10 has a threaded portion 11a which cooperates with a threaded cap 13 to form a cavity 13a defined by the cap and the left-hand end of the information transmitter 10. A reticulate window 14 is provided in the threaded cap member 13. The reticulate window 14 is designed so as to prevent the sodium peroxyborate from spilling out. The threaded engagement between cap 13 and the threaded portion 11a permits the cap to be removed so that after the information transmitter 10 is once used, the sodium peroxyborate 16 in cavity 13a may be renewed for subsequent use.

In its use, the information transmitter of the present embodiment is swallowed by the test object of which a digestive organ is believed to be suffering from an internal bleeding. The information transmitter will then reach the bleeding region, where the blood comes into contact with the sodium peroxyborate 16 in the cavity 13a through window 14 of the information transmitter, and thus the sodium peroxyborate will be decomposed to produce a heat of reaction through the catalytic function of the catalase contained in blood as previously described. This heat affects the impedance value of the transducer 12 to change the signal transmitted by the information transmitter body 11, which will in turn be received outside [by suitable receiver means, not shown] to detect the position of bleeding. Since the body temperature is not always constant the information transmitter might present a temperature change even without being contacted with blood, but such a temperature change may be easily distinguished because the temperature change resulting from the reaction of sodium peroxyborate is much more abrupt.

FIGURE 2 shows a second embodiment of the invention, which is substantially the same as that shown in FIGURE 1, except that the window 14 is covered with a layer 17 made of such material which is soluble and will readily dissolve in the bowels of the test object. Since sodium peroxyborate is water soluble, it may happen that in a long period of time after the information transmitter has been swallowed by the test object, the sodium peroxyborate 16 in cavity 13a will gradually be lost as it becomes disssolved into the digestive liquids, with the result of reduced sensitivity of the information transmitter as a blood detecter.

Thus, with the window 14 covered by a layer 17 comprised of such material as is soluble not in the stomach but in the bowels, the sodium peroxyborate will not be dissolved while in the stomach. Thus the information transmitter 10 will pass into the bowels where the layer 17 will be dissolved enabling the information transmitter to perform its proper function. An information transmitter of this type is particularly useful in the case where it is known in advance that the bleeding region lies beyond the stomach in the test object.

A third embodiment of the invention will now be referred to. Whereas, in the two embodiments described above, the blood has been detected from the heat due to decomposition reaction of sodium peroxyborate, it may also be detected by detecting the pressure change due to oxygen produced from said decomposition reaction. In this case, the pressure in the sodium peroxyborate container will not rise with the window of the container open and it is therefore necessary to use means such as a window valve to prevent the escape of oxygen gas produced. The operation of such a valve, however, need not necessarily be perfect since the pressure increase due to the production of oxygen is sufficiently abrupt to be discernable. The window valve may, for example, be mounted on the interior side of the window 14 and may be a member, such as the member 19, shown in dotted fashion, which in its normal position permits the ingress of blood into the cavity 13a so as to permit the blood to come in contact with the sodium peroxyborate. Once such a contact is made, reaction builds up pressure, driving the valve member 19 in the direction shown by arrow 20, so as to close or seal the cavity 13a [see FIGURE 2]. This pressure build-up is brought to bear against the transducer 12, which in this case would be a pressure sensitive transducer so as to effectively modulate the generating means in information transmitter body 11 of the information transmitter 10.

It will be understood that a layer of such material as is soluble not in the stomach but in the bowels may be used to prevent sodium peroxyborate from being dissolved out.

It can therefore be seen that the instant invention teaches an information transmitter capable of identifying by the generation of electromagnetic waves, the exact location of a bleeding condition within the digestive tract of a test object, such as, for example, a human being, or any animal. The means controlling the data transmitter is comprised of a solid peroxidate which reacts with catalase present in blood to generate an abrupt change in temperature, or pressure, so as to positively actuate the data transmitter of the information transmitter means.

Although there has been described a preferred embodiment of this novel invention, many variations and modifications will now be apparent to those skilled in the art. Therefore, this invention is to be limited, not by the specific disclosure herein, but only by the appending claims.

What is claimed is:

1. An information transmitter for use in detecting the presence of internal bleeding in humans or animals comprising a substantially small housing containing a predetermined quantity of peroxidate; said housing having an opening to permit the peroxidate to make physical contact with the blood; and an electromagnetic wave generating means for detecting the heat of reaction which is produced when said peroxidate comes into contact with blood to generate a signal indicative of the heat of reaction, which signal may be detected exteriorly of the test object.

2. An information transmitters for use in detecting the presence of internal bleeding in humans or animals comprising a substantially small housing containing a predetermined quantity of peroxidate; said housing having an opening to permit the peroxide to make physical contact with the blood; and an electromagnetic wave generating means for detecting the heat of reaction which is produced when said peroxidate comes into contact with blood to generate a signal indicative of the heat of reaction, which signal may be detected exteriorly of the test object, said peroxidate being sodium peroxyborate.

3. An information transmitter for use in detecting the presence of internal bleeding in humans or animals comprising a substantially small housing containing a predetermined quantity of peroxidate; said housing having an opening to permit the peroxidate to make physical contact with the blood; and an electromagnetic wave generating means for detecting the heat of reaction which is produced when said peroxidate comes into contact with blood to generate a signal indicative of the heat of reaction, which signal may be detected exteriorly of the test object; said wave generating means including temperature sensitive transducer means positioned adjacent the peroxidate in said housing to modulate the wave generating means.

4. An information transmitter for use in detecting the presence of internal bleeding in humans or animals comprising a substantially small housing containing a predetermined quantity of peroxidate; said housing having an opening to permit the peroxidate to make physical contact with the blood; and an electromagnetic wave generating means for detecting the heat of reaction which is produced when said peroxidate comes into contact with blood to generate a signal indicative of the heat of reaction, which signal may be detected exteriorly of the test object; said wave generating means including pressure sensitive transducer means positioned adjacent the peroxidate in said housing to modulate the wave generating means.

5. An information transmitter for use in detecting the presence of internal bleeding in humans or animals comprising a substantially small housing containing a predetermined quantity of peroxidate; said housing having an opening to permit the peroxidate to make physical contact with the blood; and an electromagnetic wave generating means for detecting the heat of reaction which is produced when said peroxidate comes into contact with blood to generate a signal indicative of the heat of reaction, which signal may be detected exteriorly of the test object; soluble film means positioned over said opening to prevent said peroxidate from being dissolved into the digestive liquids of the test object before said information transmitter reaches the region where the internal bleeding is occurring.

6. An information transmitter for use in detecting the presence of internal bleeding in humans or animals comprising a substantially small housing containing a predetermined quantity of peroxidate; said housing having an opening to permit the peroxidate to make physical contact with the blood; and an electromagnetic wave generating means for detecting the heat of reaction which is produced when said peroxidate comes into contact with blood to generate a signal indicative of the heat of reaction, which signal may be detected exteriorly of the test object; valve means being positioned across said opening; said valve means being adapted to seal said opening when the blood reacts with the peroxyborate to emit oxygen; pressure sensitive transducer means positioned adjacent said peroxyborate to modulate the wave generating means.

7. An information transmitter for use in detecting the presence of internal bleeding in humans or animals comprising a substantially small housing containing a predetermined quantity of peroxidate; said housing having an opening to permit the peroxidate to make physical contact with the blood; and an electromagnetic wave generating means for detecting the heat of reaction which is produced when said peroxidate comes into contact with blood to generate a signal indicative of the heat of reaction, which signal may be detected exteriorly of the test object; film means being positioned across said opening in the interior of said housing; a portion of said film being spaced from said opening to permit ingress of blood into said housing through said opening; said film means being adapted to seal said opening when the blood reacts with the peroxyborate to emit oxygen; pressure sensitive transducer means positioned adjacent said peroxyborate to modulate the wave generating means.

References Cited by the Examiner
UNITED STATES PATENTS

| | | | |
|---|---|---|---|
| 2,958,781 | 11/60 | Marchal | 128—2.1 X |
| 3,034,356 | 5/62 | Bieganski | 128—2.1 X |
| 3,118,439 | 1/64 | Perrenoud | 128—2 |
| 3,133,537 | 5/64 | Muth | 128—2 |
| 3,144,017 | 8/64 | Muth | 128—2.1 |

OTHER REFERENCES

Mackay, "Telemetering," pp. 100–105 of IRE Trans. on Med. Elect., June 1959.

RICHARD A. GAUDET, *Primary Examiner.*

LOUIS R. PRINCE, *Examiner.*